United States Patent
Poppe et al.

(10) Patent No.: US 7,327,773 B2
(45) Date of Patent: Feb. 5, 2008

(54) SHORT-PULSE LASER DEVICE WITH A PREFERABLY PASSIVE MODE COUPLING AND MULTIPLE REFLECTION TELESCOPE THEREFOR

(75) Inventors: Andreas Poppe, Zwentendorf (AT); Andreas Stingl, Korneuburg (AT)

(73) Assignee: Femtolasers Produktions GmbH (AT)

( * ) Notice: Subject to any disclaimer, the term of this patent is extended or adjusted under 35 U.S.C. 154(b) by 321 days.

(21) Appl. No.: 10/514,894

(22) PCT Filed: May 13, 2003

(86) PCT No.: PCT/AT03/00136

§ 371 (c)(1),
(2), (4) Date: Jan. 31, 2005

(87) PCT Pub. No.: WO03/098314

PCT Pub. Date: Nov. 27, 2003

(65) Prior Publication Data

US 2005/0129082 A1   Jun. 16, 2005

(30) Foreign Application Priority Data

May 17, 2002  (AT) ................................ A 763/2002

(51) Int. Cl.
  *H01S 3/08* (2006.01)
(52) U.S. Cl. ........................................................ 372/95
(58) Field of Classification Search ............ 372/18–21, 372/92, 93, 97–99, 107, 95
See application file for complete search history.

(56) References Cited

U.S. PATENT DOCUMENTS 3,437,954 A * 4/1969 Herriott et al. ............. 359/346
3,550,039 A * 12/1970 Herriott .................... 359/238
3,571,738 A * 3/1971 Gloge ....................... 359/346

(Continued)

OTHER PUBLICATIONS

A. Poppe, et al., *A sub-10 fs, 2.5-MW Ti:sapphire oscillator*, Ultrafast Optics 1999, pp. 154-157, Ascona, Switzerland (1999).

(Continued)

*Primary Examiner*—Minsun Oh Harvey
*Assistant Examiner*—Xinning Niu
(74) *Attorney, Agent, or Firm*—Ostrolenk, Faber, Gerb & Soffen, LLP

(57) ABSTRACT

The invention relates to a short-pulse laser device (11) with a preferably passive mode coupling. Said device comprises a resonator (12) which contains a laser crystal (14) in addition to several mirrors (M1-M7, OC) that define a long resonator arm (17) and a short resonator arm (16), one (M1) of said mirrors forming a pump beam coupling-in mirror and another (OC) forming a laser beam output coupler and comprising a multiple reflection telescope (18) that increases the length of the resonator and is allocated to the resonator arms (16, 17). Said telescope is constructed using mirrors (25, 26), in order to reflect a laser beam (15) that is coupled into the space between them back and forth several times, prior to being decoupled back into the other resonator, whereby sequential eccentric reflection points (1 to 8; 1' to 8') on the mirrors (25, 26) are offset in relation to one another. The telescope (18) comprises only one curved mirror (26), in addition to a planar mirror (25), whose position corresponds at least substantially to the center (25') of an imaginary multiple reflection assembly comprising two curved mirrors (26a, 26b), whereby the one curved mirror (26) of the telescope (18) also contains the reflection points of the other imaginary curved mirror. The invention also relates to a multiple reflection telescope (18) for said device.

16 Claims, 11 Drawing Sheets

U.S. PATENT DOCUMENTS

| | | | | |
|---|---|---|---|---|
| 3,763,443 | A | * | 10/1973 | Kinsel et al. ............... 372/12 |
| 5,241,551 | A | * | 8/1993 | Chernoch et al. ............ 372/22 |
| 5,796,761 | A | * | 8/1998 | Injeyan et al. ............... 372/3 |
| 6,728,273 | B2 | * | 4/2004 | Perry ........................... 372/18 |
| 2001/0021215 | A1 | * | 9/2001 | Bunting et al. ............... 372/70 |

OTHER PUBLICATIONS

D. Herriott, et al., *Off-Axis Paths in Spherical Mirror Interferometers*, Applied Optics, Apr. 1964, vol. 3, No. 4, pp. 523-526.

Alphan Sennaroglu, et al., *Design criteria for Herriott-type multi-pass cavities for ultrashort pulse lasers*, Optics Express, May 5, 2003, vol. 11, No. 9, pp. 1106-1112.

S. H. Cho, et al., *Low-repetition-rate high-peak-power Kerr-lens mode-locked Ti:Al$_2$O$_3$ laser with a multiple-pas cavity*, Optics Letters, Mar. 15, 1999, vol. 24, No. 6, pp. 417-419.

S.H. Cho et al., *Generation of 90-nJ pulses with a 4-MHz repetition-rate Kerr-lens mode-locked Ti:Al$_2$O$_3$ laser operating with net positive and negative intracavity dispersion*, Optics Letters, Apr. 15, 2001, vol. 26, No. 8, pp. 560-562.

Kneubuhl and Sigrist: "Laser", Teubner Studienbucher Physik, 1988 Stuttgart, Seiten 68-75.

Cho S H et al: Generation of 90-NJ Pulses with a 4-MHZ Repetition-Rate Kerr-Lens Mode-Locked TI: AL 203 Laser Operating with Net Positive and Negative Intracavity Dispersion: Optic Letters, Optical Society of America, Washington, US, vol. 26, No. 8, Apr. 15, 2001, pp. 560-562, ISSN: 0146-9592 cited in the application.

Cho S H et al: Low-Repetition-Rate High-Peak-Power Kerr-Lens Mode-Locked TI: AL203 Laser with a Multiple-Pass Cavity: Optics Letters, Optical Society of America, Washinton, US, vol. 24, No. 6, Mar. 15, 1999, pp. 417-149, ISSN: 0146-9592.

Sennaroglu A et al: "Design criteria for Herriott-type multi-pass cavities for ultrashort pulse lasers" Optics Express, May 5, 2003, Opt. Soc. America, USA, vol. 11, No. 9, ISSN: 1094-4087.

* cited by examiner

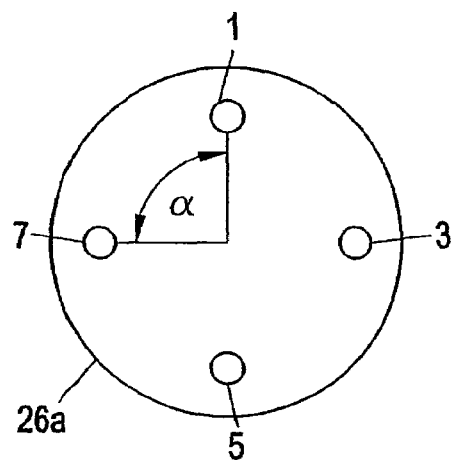
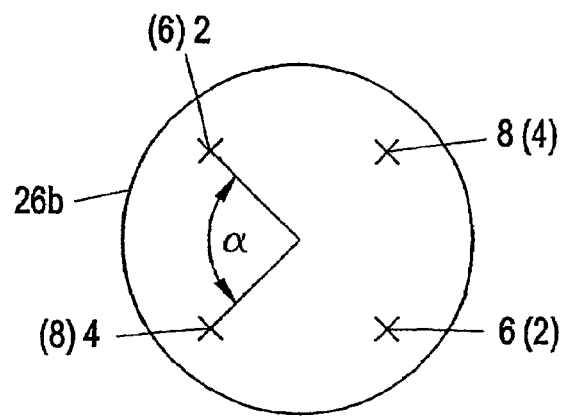
FIG. 4     FIG. 5
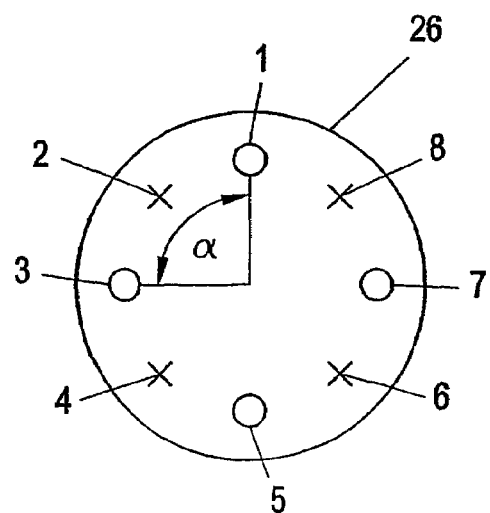
FIG. 8

SHORT-PULSE LASER DEVICE WITH A PREFERABLY PASSIVE MODE COUPLING AND MULTIPLE REFLECTION TELESCOPE THEREFOR

CROSS REFERENCE TO RELATED APPLICATION

The present application is a 35 U.S.C. § 371 national phase conversion of PCT/AT2003/000136 filed 13 May, 2003, which claims priority of Austrian Application No. A 763/2002 filed 17 May, 2002.

The PCT International Application was published in the German language.

The invention relates to a short pulse laser device with preferably passive mode-locking, with a resonator containing a laser crystal as well as several mirrors which define a long resonator arm as well as a short resonator arm, one of which forms a pump beam in-coupling mirror, and another one forms a laser beam out-coupler, and with a multiple reflection telescope increasing the resonator length and associated to one of the resonator arms, which telescope is constructed using mirrors in order to reflect a laser beam that is coupled into the space between them back and forth between the mirrors several times before it is out-coupled back into the remaining resonator, sequential eccentric reflection points on the mirrors being offset relative to one another.

Likewise, the invention relates to a multiple reflection telescope for a short-pulse laser device for increasing its resonator length, which multiple reflection telescope is constructed using mirrors so as to reflect a laser beam coupled into the space between them back and forth between the mirrors several times before it is out-coupled back into the remaining laser device, sequential eccentric reflection points on the mirrors being offset relative to one another.

Recently, short-pulse laser devices have become increasingly interesting, since with a view to the extremely short pulse durations in the femtosecond range, with peak pulse outputs of >1 MW, the most varying applications in science and industry become possible. Thus, such short-pulse laser devices having pulse durations in the femtosecond range can be used for the time-resolved investigation of the interaction between electromagnetic radiation and matter. On the other hand, with a view to the increasing miniaturization in material processing, it has become possible to produce the finest structures with precision and high speed. Femtosecond laser devices with a high output pulse energy and a high repetition rate are ideal to be employed for this. What is desirable in this respect is a laser device which produces laser pulses having a pulse duration in the order of 10 fs as well as an energy of, for example, 25 to 30 nJ at a pulse repetition rate in the order of 10 MHz. The pulse repetition rate which, compared to earlier laser devices, is relatively slow in the femtosecond range (in the order of 10 MHz instead of 80 MHz, e.g.) in a common titanium-sapphire-fs laser is desired because then a higher pulse peak output, put, or a higher pulse energy, respectively, can be achieved, which is of interest for the processing of material. However, such comparatively low repetition rates which, vice versa, mean a relatively long pulse round trip time in the laser resonator, by mere calculation yield a corresponding increase in the length of the resonator, e.g. from 2 m to 16 m, causing an increase in the dimensions of the laser device.

Based on an earlier publication by D. Herriott et al., "Off-Axis Paths in Spherical Mirror Interferometers", Applied Optics, April 1964, vol. 3, No. 4, pp. 523-526, lenghtening of the pulse round trip times has then been suggested by S. H. Cho et al. in the article "Generation of 90-nJ pulses with a 4-MHz repetition-rate Kerr-lens mode-locked Ti:Al$_2$O$_3$ laser operating with net positive and negative intracavity dispersion", Optics Letters, 15 Apr. 2001, vol. 26, No. 8, pp.560-562, by providing a multiple-pass resonator part, here also called "multiple reflection telescope" or "tele-scope" in short (according to the article by A. Poppe et al., "A Sub-10 fs, 2.5-MW Ti:Sapphire Oscillator", Ultrafast Optics 1999, pp. 154-157, Ascona, Switzerland (1999)), to thus increase the duration of the pulse round trip by a multiple passage in this resonator part, due to a plurality of reflections on mirrors arranged opposite each other, and to thereby lower the repetition rate. In this manner it becomes possible to increase the energy portion of the pulse part that is out-coupled per round trip.

However, what is detrimental with these known laser devices, or telescopes, respectively, is that relatively large dimensions are still required for the laser resonator so that the dimensions of the laser device in sum result in a relatively bulky device. Furthermore, in the known laser devices also the stability of the laser radiation poses a problem, and it must be taken into consideration that the telescope will cause images of the laser beam cross-section which, for stability purposes, must be adapted as good as possible to the remaining resonator. However, in the known devices, the situation is such that already slight imprecisions in the positions of the mirrors of the telescope and thus already relatively slight resonator length changes result in substantial changes in the beam cross-section, with the consequence of overall instabilities in the resonator. Furthermore, it is detrimental that in the laser device known from the article by Cho et al., where the laser beam is coupled into the telescope part by slits in one of the telescope mirrors and is out-coupled again from this telescope part by corresponding slits in the mirror, the mirror design is complex, and the production thereof poses problems.

Therefore, it is an object of the invention to allow for an increase in the peak pulse output in a short-pulse laser device as initially defined, by increasing the pulse round trip time in the laser device with nevertheless comparatively small resonator dimensions; furthermore, a good adaptation of the telescope to the remaining resonator and, thus, a high stability in the laser beam production shall be rendered possible, and also an exact fine adjustment of the adaptation to the resonator parts shall be feasible. Furthermore, it is an object of the invention to provide simple adapted means for the in- and out-coupling of the laser beam in the region of the telescope of the resonator.

The inventive short-pulse laser arrangement of the initially defined type is characterized in that the telescope has only one curved, preferably concave, mirror as well as a plane mirror whose position at least substantially corresponds to the middle of an imaginary multiple reflection arrangement with two curved mirrors, whereby the one curved mirror of the telescope also contains the reflection points of the imaginary other curved mirror.

Likewise, the invention provides a telescope as initially defined and including the characteristic features that as telescope mirrors, only one curved, preferably concave, mirror as well as a plane mirror are provided, the position of the plane mirror corresponding at least substantially to the middle of an imaginary multiple reflection arrangement with two curved mirrors, whereby the one curved mirror of the telescope also contains the reflection points of the imaginary other curved mirror.

Due to the aforementioned design, the teslescope is practically halved in its dimensions and "folded". This measure is based on the finding that when reflected on a curved mirror, the wave front of the laser beam describes a likewise curved area, the wave front then changing until its reflection on an oppositely arranged mirror such that it will correspond to the curvature prevailing there, a situation being achieved in the middle therebetween in which the wave front is plane; at this site, according to the invention, the plane mirror is arranged. Apart from the reduction in dimensions attained thereby, a substantial advantage is also seen in the fact that the plane mirror—usually multilayer mirrors of dielectric materials are used in laser resonators—can be produced at substantially more favorable prices than curved substrate mirrors. As an additional advantage it results with this device that for in-coupling of the laser beam, or for its out-coupling, sufficient space is available when this in-coupling and out-coupling occurs approximately in the middle between the curved mirror and the plane mirror, since there the neighboring beam paths created in the course of the multiple reflections are relatively widely spaced apart so that, as will be explained later on, appropriate in- and out-coupling mirrors can be mounted for "breaking up" the one beam, or beam path, respectively, without any problems. By this, on the other hand, the mirrors responsible for the multiple reflections can be produced without any slits, through-bores or the like.

With a view to the stability of the laser radiation as well as to the design of the telescope's mirrors, which is to be as simple as possible, as well as to as low a load as possible on the mirrors during operation, it has further proven advantageous if on the one curved mirror, alternatingly reflection points of this mirror as well as reflection points of the imaginary other curved mirror are arranged on an imaginary circle line at arc distances corresponding to each other. With this device, thus, there will be no "inter-leaving" of the beam paths of the laser radiation between the mirrors of the telescope, much rather, the beam paths which the laser beam follows during the multiple reflections, will be zig-zag-like, corresponding to an approximate cylinder surface or frustoconical surface between the mirrors.

With a view to the specially sought increase in the pulse round trip for the design of the short-pulse laser device for an application in production technology, it is furthermore, suitable if a total of eight reflection points is provided on the one curved mirror.

For the stability of the laser radiation, and during the adaptation of telescope and resonator, respectively, it is advantageous if the distance between the mirrors and the radius of curvature of the curved, concave mirror correspond to the relation $$L/R = 1 \pm \sqrt{(1+\cos\alpha)/2},$$

wherein
L is twice the distance between the curved mirror and the plane mirror,
R is the radius of curvature of the curved mirror, and
$\alpha$ is the central angle between two respective consecutive reflection points actually associated to the one curved mirror and located on a circle line.

For a simple, stable embodiment, here it is further provided for the curved mirror of the telescope to be a concave mirror, for which it holds:

$$L/R = 1 - \sqrt{(1+\cos\alpha)/2}.$$

As has already been mentioned, with the inventive design with the "folding" of the telescope, a suitable possibility for in- and out-coupling the laser beam in the region of the telescope is provided, and accordingly, a particularly advantageous embodiment of the short-pulse laser device according to the invention is characterized in that substantially in the middle between the curved mirror and the plane mirror, in- and out-coupling mirrors for the laser beam are provided in the path of one of the beam paths between these two mirrors.

Finally, for stability purposes, for a better adaptation of the telescope to the remaining resonator, it is particularly advantageous if the telescope is associated with the long resonator arm. Namely, investigations have shown that at the long resonator arm, a laser beam with a relatively large cross-section is available for in-coupling into the telescope part, wherein, with the present telescope design, the cross-section of the laser beam changes only slightly during the different reflections in the telescope part, before —practically with the same cross-section as during in-coupling—it is out-coupled again and supplied to the remaining resonator part. By this, any possible minor length changes, i.e. minor changes in the distances between the lenses of the telescope, have hardly any effect since by this the beam cross-section does not change substantially. In this manner, an optimum adaptation between the telescope and the remaining resonator is rendered feasible.

In the following, the invention will be explained in more detail by way of preferred exemplary embodiments illustrated in the drawings to which, however, it shall not be restricted. Therein, FIG. 1 shows a schematic representation of the set-up of a short-pulse laser device with telescope according to the invention;

FIG. 2 shows such a short-pulse laser device when arranged on a mounting plate, also in- and out-coupling of the laser beam in the region of the telescope being schematically depicted;

FIG. 3 schematically shows a view of a conventional telescope with two concave curved telescope mirrors;

FIGS. 4 and 5 show schematic views of this telescope mirrors with the reflection points thereon;

FIG. 8 shows the concave curved telescope mirror of FIG. 7 with the reflection points in a schematic view according to FIGS. 4 and 5;

Figure 9:
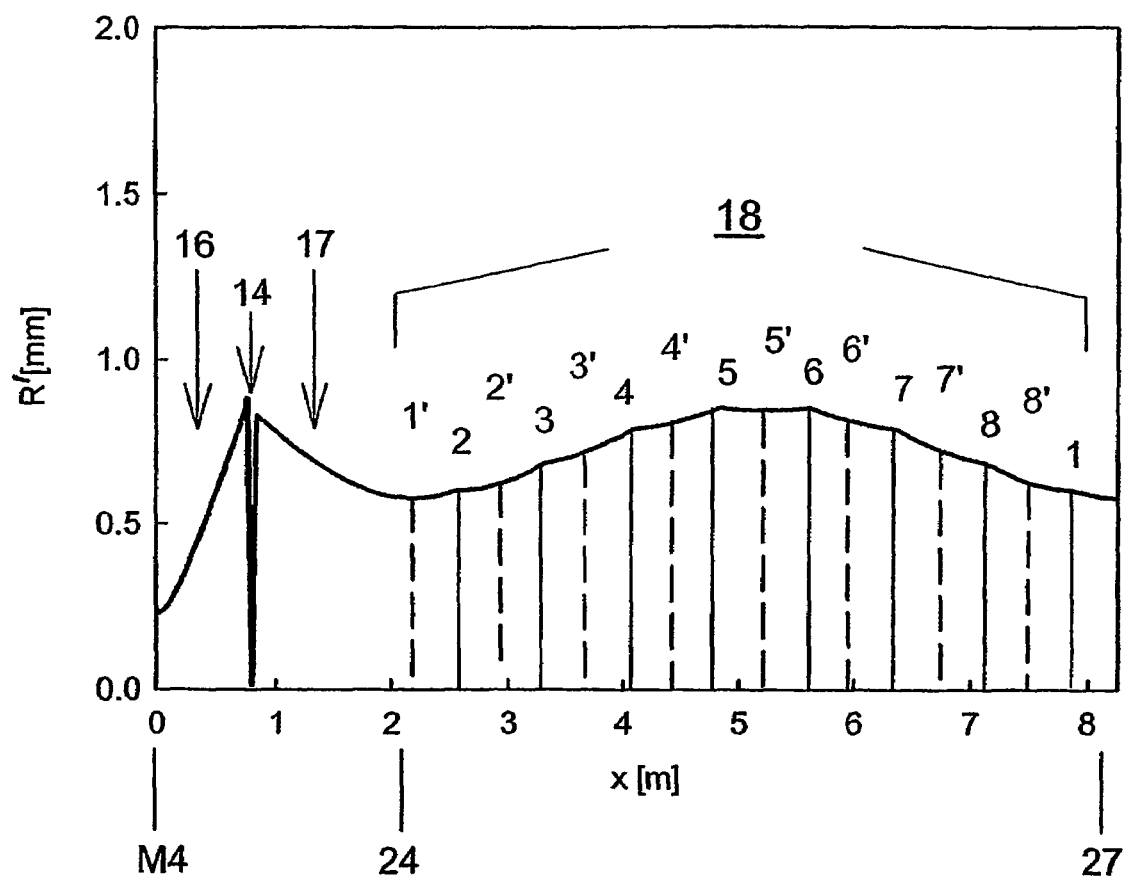
Figure 10:
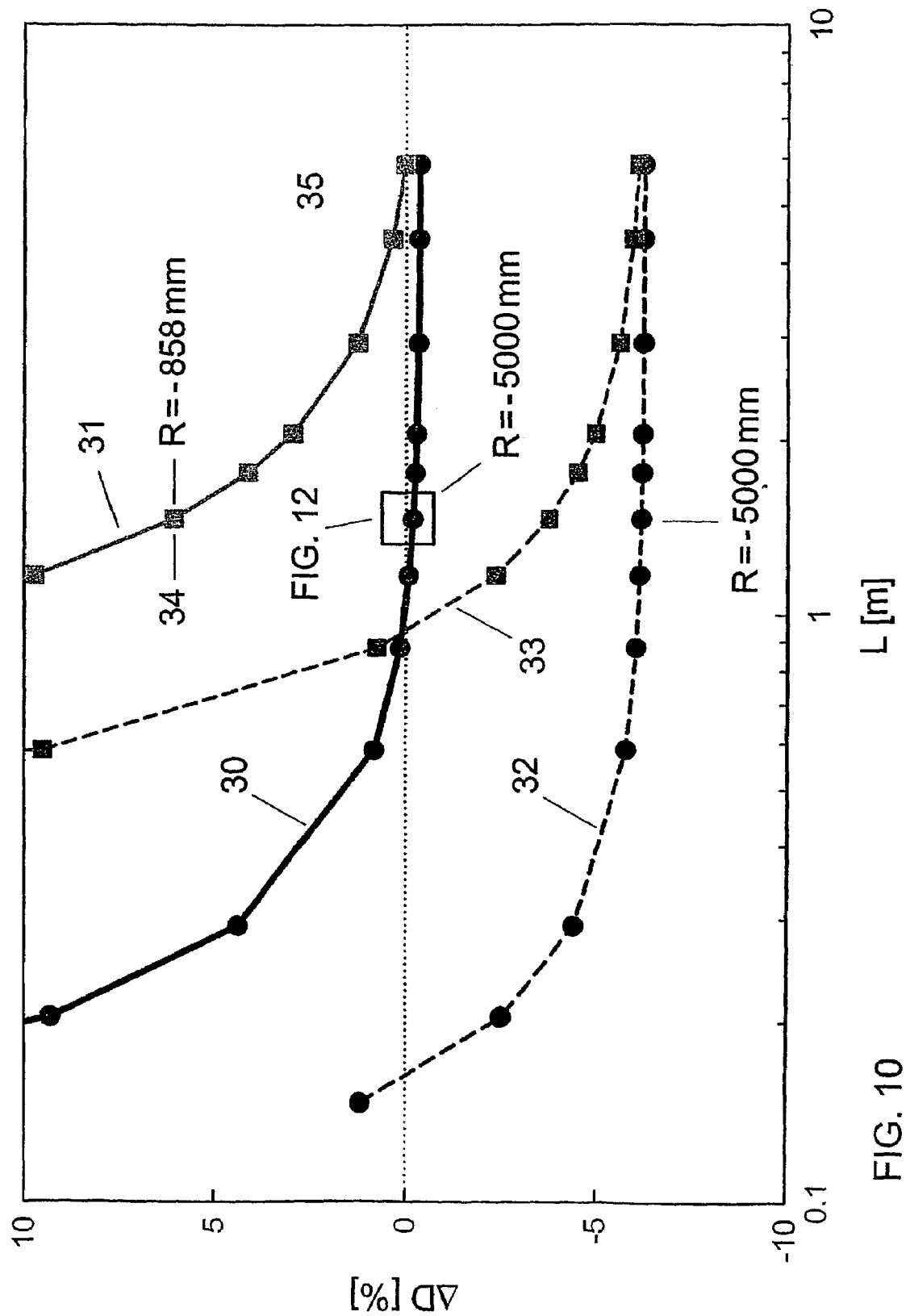

FIG. 9, in a diagram, shows the course of the radius R (in mm) of the laser beam in transverse direction versus a distance x (in m) passed by the laser beam in the resonator, with a short resonator arm, a long resonator arm and the telescope associated therewith;

FIG. 10, in a diagram and by way of four examples, shows the changes in the beam diameter versus the space between the telescope mirrors so as to illustrate the adaptation of the laser beam with a view to the stability; and FIGS. 11, 12, 13, 14 and 15, in diagrams similar to FIG. 9, show the course of the transversal beam radius R' versus the distance x passed in five actual devices.

Figure 1:
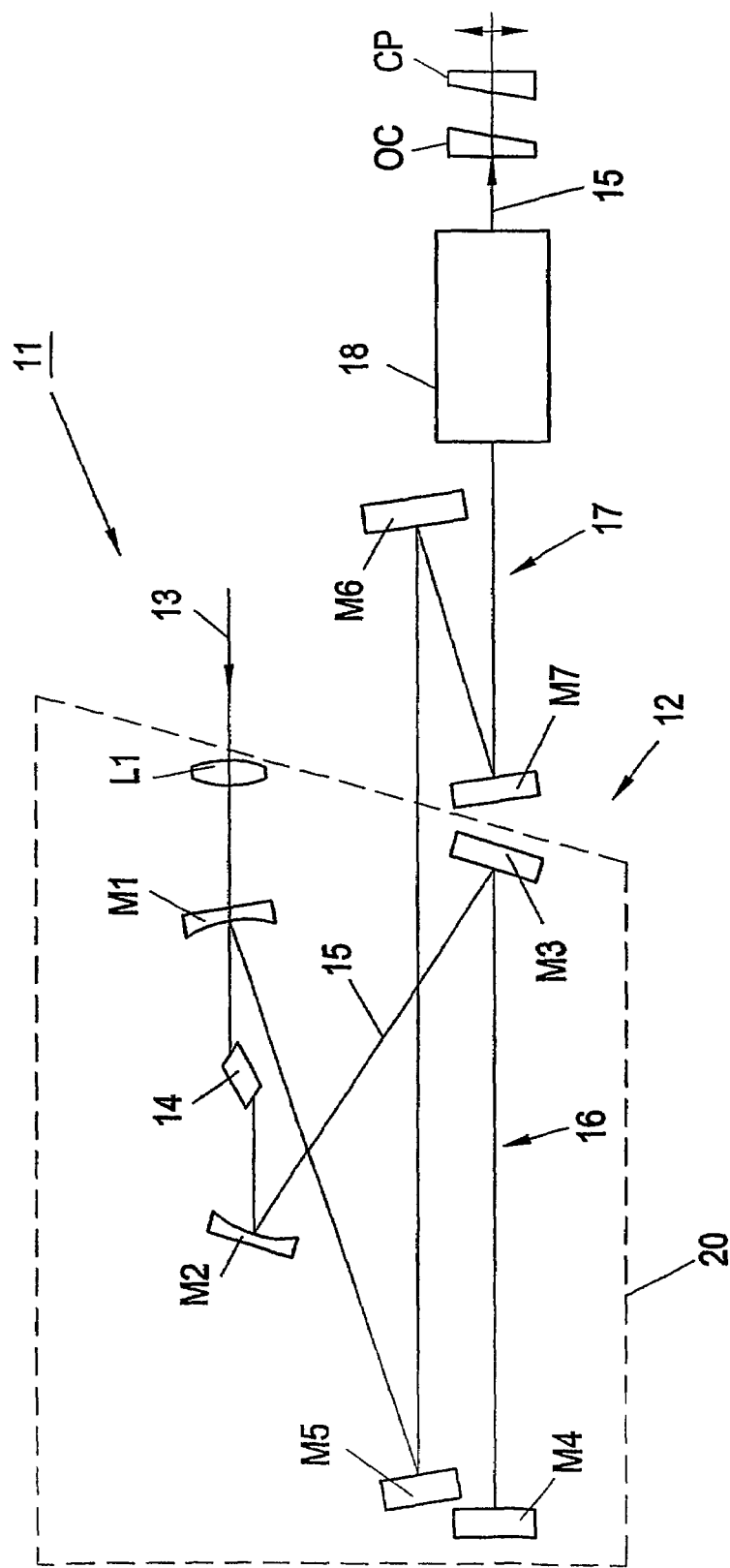

In FIG. 1, a short-pulse laser device 11 is schematically illustrated in which, for instance, the Kerr-lens mode locking principle known per se is used for generating the short-pulses.

According to FIG. 1, the laser device 11 comprises a resonator 12 to which a pump beam 13, an argon laser beam, e.g., is supplied. The pump laser itself, the argon laser, e.g., has been omitted in FIG. 1 for the sake of simplicity and is part of the prior art.

After passing through a lens L1 and a dichroic mirror M1, the pump beam 13 excites a laser crystal 14, a titanium:sapphire(Ti:S) solid laser crystal in the present example. The dichroic mirror M1 is permeable for the pump beam 13, yet highly reflective for the Ti:S laser beam. This laser beam 15, the resonator beam, then impinges on a laser mirror M2 and is reflected by the latter to a laser mirror M3. This laser mirror M3 again reflects the laser beam to a laser mirror M4, and from there the laser beam 15 is reflected back to the laser mirrors M3, M2 and M1, passing through the laser crystal 14 a second time. This resonator part including the mirrors M2, M3 and M4 forms a so-called short resonator arm 16 which is Z-shaped in the example shown.

From the mirror M1, the laser beam 15 then is reflected to a laser mirror M5 and from the latter to a laser mirror M6 as well as to a further laser mirror M7, whereby a second Z-folded resonator arm 17 is formed, which is provided as long resonator arm 17. From the laser mirror M7, the laser beam 15 gets into a telescope 18 merely schematically shown in FIG. 1, and from there it gets to an end mirror OC acting as an out-coupler. Via this out-coupler end mirror OC, a part of the laser beam 15 is out-coupled under provision of a compensation possibility, with a compensation platelet CP as well as mirrors not further illustrated and made in thin-film technique providing for a dispersion compensation as well as for preventing undesired reflections in the direction of laser resonator 12 from occurring.

The laser crystal 14 is a plane-parallel body which is optically non-linear and forms a Kerr element which has a greater effective optical thickness for higher field strengths of the laser beam 15, yet a slighter effective thickness where the field strength, or intensity, respectively, of the laser beam is lower. This per se known Kerr effect is utilized for self-focusing of the laser beam 15, i.e. the laser crystal 14 constitutes a focusing lens for the laser beam 15. Mode-locking may furthermore be realized in a per se conventional manner, e.g. by means of an aperture not further illustrated in FIGS. 1 and 2 (cf. e.g. AT 405 992 B); however, it would also be conceivable to design an end mirror, e.g. M4, as a saturable Bragg reflector and thus use it for mode-locking.

The mirrors M1, M2 . . . M7 are made in thin-film technique, i.e. they are comprised of many layers which, when reflecting the ultra-short laser pulse—which has a large spectral bandwidth—, fulfill their function. The different wave length components of the laser beam 15 enter to different depths into the layers of the respective mirror before being reflected. In this manner, the different wave length components are delayed at the respective mirror for different amounts of time; the short-wave components will be reflected rather outwardly (i.e. towards the surface), the long-wave components, however, will be reflected deeper within the mirror. By this, the long-wave components will be temporally delayed relative to the short-wave components. In this manner, a dispersion compensation can be attained insofar as pulses of a particularly short time range (preferably in the range of 10 femtoseconds and therebelow) have a wide frequency spectrum; this is a result of the fact that the different frequency components of the laser beam 15 in the laser crystal 14 "see" a different refraction index (i.e., the optical thickness of the laser crystal 14 is differently large for the different frequency components, and the different frequency components therefore will be differently delayed when passing through the laser crystal 14. This effect can be counteracted by the above-mentioned dispersion compensation at the thin film laser mirrors M1, M2 . . . M7.

What has so far been described is a per se conventional set-up of a short-pulse laser with mode-locking, and a detailed description of the latter therefore is not required.

In operation, with each round trip of the laser beam 15 in the short resonator arm 16 as well as in the long resonator arm 17, a part of the laser pulse is out-coupled by means of the out-coupler OC as mentioned before. In practice, the length of a laser resonator 12 without telescope 18 may be approximately 2 m, a repetition rate according to a frequency of 75 to 100 MHz, e.g. 80 MHz, being achieved, for instance. In order to achieve a higher pulse peak output, i.e. pulse energy, by increasing the round trip time and, thus, by reducing the repetition rate, with a view to using the laser device 11 e.g. for the processing of material, the length of the laser resonator 12 is enlarged by the installation of the telescope 18. When multiplying the entire resonator length by the factor eight, which means for instance with a resonator length of approximately 15 m or 16 m, the repetition rate may then lie e.g. at approximately 10 MHz. To achieve this long path lengths for the laser pulses, a mirror arrangement is provided in the telescope 18 so as to achieve a multiple reflection of the laser beam 15 whereby the construction length of the telescope 18 can be shortened according to the multiple reflections.

Figure 2:
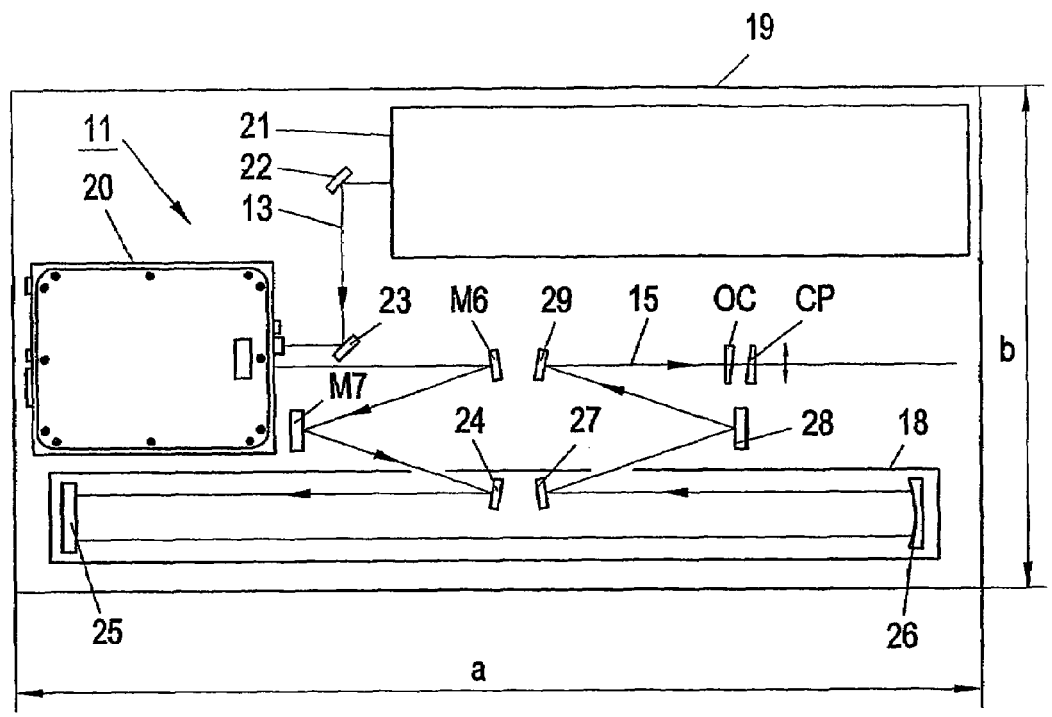

In FIG. 2, the arrangement of such a laser device 11 according to FIG. 1 on a mounting plate 19 is schematically illustrated, which has a size a times b of for instance a=900 mm times b=450 mm. On this mounting plate 19, the part 20 of the laser resonator 12 framed in broken lines in FIG. 1 is mounted encapsulated in a housing, and furthermore also the pump laser 21 is arranged on the mounting plate 19, from which the pump beam 13 is supplied to the laser resonator part 20 via two mirrors 22, 23. From this resonator part 20, the laser beam 15 emerges in the direction of laser mirror M6, by which it is reflected to laser mirror M7, as has been described. From there, the laser beam 15 enters the telescope 18, an in-coupling mirror 24 being arranged in the telescope 18, e.g. in a housing, in one of the several beam paths between two oppositely arranged telescope mirrors 25, 26. This in-coupling mirror 24 reflects the laser beam 15 to the one—in FIG. 2 left-hand—plane telescope mirror 25 which then will reflect the laser beam 15 to the oppositely arranged, concavely curved telescope mirror 26. Then the laser beam 15 will be reflected back and forth several times, e.g. eight times, between these two telescope mirrors 25, 26, in this example a total of 8 reflection points corresponding to the eight laser beam reflections being provided on the concavely curved telescope mirror 26 on an imaginary circle line about the center of the concave mirror 26, as will be explained in more detail hereinafter by way of FIG. 8 in connection with FIG. 7.

Finally, the laser beam 15 is coupled out of the telescope 18 by means of an out-coupling mirror 27 which is arranged in the vicinity of the in-coupling mirror 24 in the same beam path as the former, and which reflects the laser beam 15 to a further mirror 28 from where the laser beam 15 gets to the outcoupler OC via mirror 29. To simplify matters, these mirrors 28, 29 are not further illustrated in the schematic illustration of FIG. 1. Besides, if a telescope 18 were not present, the position of the end mirror (outcoupler) OC would be the position of the laser mirror M6 in FIG. 1.

An important aspect in a short-pulse laser device with an increased laser pulse round trip time is the stability of the laser oscillation, wherein an appropriate adaptation must be effected with a view to images of the laser beam cross-section caused by the individual mirrors. A further important aspect which is of special importance particularly for industrial applications, i.e. in the case of the processing of materials, is the compactness of the laser device 11; the aforementioned dimensions of 900 mm×450 mm correspond to conventional laser devices for industry, wherein, however, here (cf. FIG. 2) additionally the telescope part 18—which may also form a separate unit—is built in so that the longer round trip times of the laser beam 15 desired and thus the higher pulse energies can be achieved without an increase in dimensions. What is sought is pulse energies in the order of several hundred nJ instead of the earlier less than 10 nJ. With this, peak pulse outputs of more than 2 MW can be achieved.

Other than in earlier laser devices with a telescope, in the present laser device 11, the telescope 18, as mentioned, is associated with the long resonator arm 17, since this is advantageous for the stability of the oscillation, as will also be explained in more detail hereinafter with reference to FIG. 9. In the telescope 18, the laser beam 15 moves back and forth several times, e.g. eight times, between the mirrors 25, 26 in zig-zag manner approximately along an imaginary cylindrical surface or frusto-conical surface; when arranging the in-coupling mirror 24 and the out-coupling mirror 27 approximately in the middle of the length of the telescope 18, there will be sufficient space for the mirrors 24, 27, since the distance to the next beam path at this location is relatively large so that the other beam paths of the laser beam 15 between the mirrors 25, 26 will not be adversely affected. What is important here is also the so-called "weakly focusing" arrangement prevailing here, which will be explained in more detail later on.

For the present embodiment it is particularly important that an extremely short telescope part 18 is attained despite the lengthening of the path length of the laser beam 15 to, for instance, the 8-fold by a very special configuration which shall now be explained in more detail by way of FIGS. 3 to 8.

Figure 3:
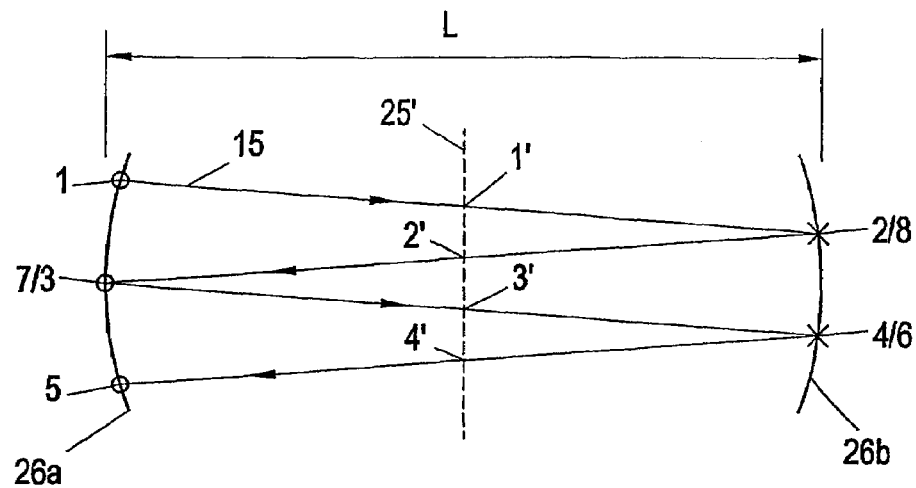
Figure 6:
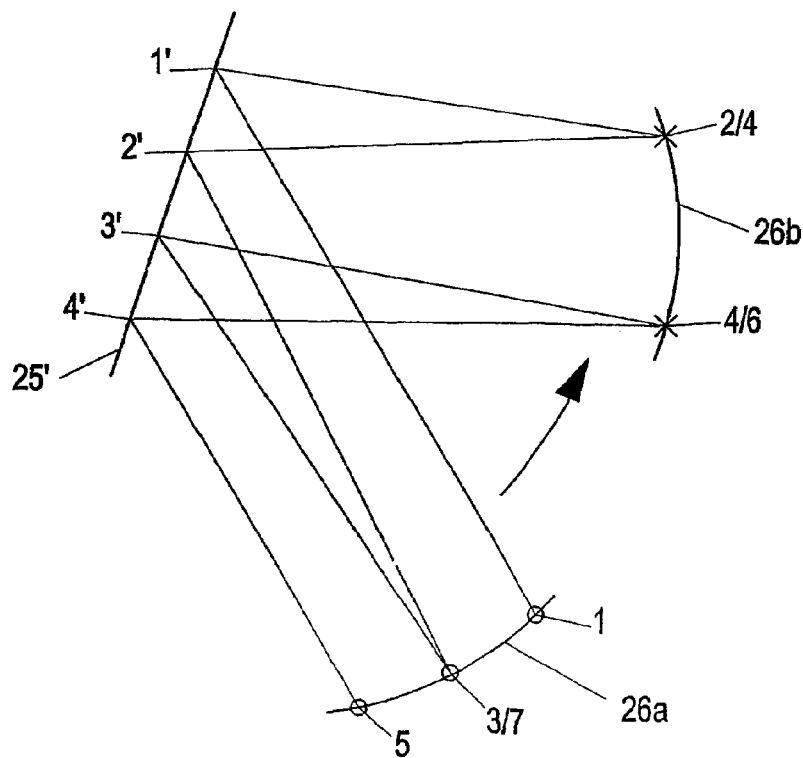
FIG. 6 shows an imaginary intermediate step during a "folding" of such a telescope according to FIG. 3, by providing a plane telescope mirror.

In FIG. 3, a per se conventional basic set-up of a telescope with two concavely curved mirrors 26a, 26b is illustrated, a laser beam 15 being reflected back and forth several times between the two mirrors 26a, 26b. The type of reflection is such that the laser beam is reflected back and forth in zig-zag manner in an approximately cylindrical generated surface, i.e. between the reflection points 1 to 5 (and, further on, to 8, wherein the reflection points 6, 7 and 8 in FIG. 3 are arranged in congruence to the reflection points 4, 3, and 2, cf. also the pertaining FIGS. 4 and 5). Of course, when speaking of a zig-zag-like course "according to a cylindrical generated surface", this is not quite precise because the individual beam paths between the mirrors 26a, 26b are straight and extend obliquely so that they cannot form generatrices of the cylinder surface, yet the course of the multiply reflected laser beam 15 can be relatively well approximated as corresponding to such a cylindrical surface.

The zig-zag-like course, or the angular offset, respectively, of the individual beam paths also results from the two schematic (inner side) views of the mirrors 26a, 26b according to FIGS. 4 and 5, where the reflection points of the laser beam 15 on the mirrors 26a, 26b, numbered from 1 to 8, are shown. There, the beam moves from the reflection point 1 on mirror 26a to the reflection point 2 angularly offset relative thereto, on the other mirror 26b, and from there to the—again angularly offset—reflection point 3 on mirror 26a and so on. In the exemplary embodiment illustrated, there results a central angle α of 90° at each mirror 26a, 26b, as angular offset for the associated reflection points, e.g. 2 and 4. In case of more than the 2×4 reflections, the central angle α will be accordingly smaller.

The type of multiple reflection between the mirrors 26a, 26b of the telescope 18 previously explained by way of FIGS. 3 to 5 is also termed as "weakly focusing" arrangement. On the other hand, a "highly focusing" arrangement would be given if, e.g., from the reflection point 1 on mirror 26a the laser beam were reflected to reflection point 6 on mirror 26b, and from there to point 3 on mirror 26a, and from there again to reflection point 8 on mirror 26b, to the reflection point 5 on mirror 26a, to reflection point 2 on mirror 26b, to reflection point 7 on mirror 26a and to reflection point 4 on mirror 26b, before the beam is reflected back in the direction to reflection point 1. With this beam course, a bundling or "focusing" would be obtained in the region of the middle 25' between the two mirrors 26a, 26b, schematically shown by a broken line in FIG. 3. Investigations have shown that for the present design of the telescope 18, as already suggested in FIG. 2 and to be subsequently described in more detail with reference to FIGS. 7 and 8, the weakly focusing arrangement resulting from FIGS. 3 to 5 is more suitable, particularly since the beam paths then are appropriately far apart in the region in question between the middle 25' and the telescope mirror 26. As will be explained hereinafter, the plane mirror 25 (cf. also FIG. 6) will be arranged in the middle 25', and since between this middle 25' and the concave mirrors 26a, and 26b, respectively, the beam paths in a weakly focusing arrangement are still sufficiently spaced apart, it is possible without any problems to accommodate the in-coupling mirror 24 and the out-coupling mirror 27 by breaking up merely one beam path.

In FIG. 5, also the consecutive numbers of the—appropriately offset—reflection points for the instance of the highly focusing arrangement have been indicated in parentheses beside the numbers 2, 4, 6 and 8, for the reflection points for the weakly focusing arrangement, for the purpose of a better illustration.

From FIG. 3 it is furthermore explainable that the laser beam 15 in the respective beam path, e.g. from reflection point 1 to reflection point 2, at first has a wave front with a curvature corresponding to the curvature of the mirror 26a, which then changes into an opposite curvature corresponding to that on mirror 26b in reflection point 2. In the middle 25' therebetween, there is a situation with a plane wave front. This is utilized by the present invention in that a plane mirror, telescope mirror 25, is arranged in this middle 25'. Then the two telescope mirrors 26a, 26b shown in FIG. 3 are "folded", i.e. brought into congruence, as appears from the schematic illustration in FIG. 6 in an imaginary intermediate step. For the purpose of an improved understanding, it is illustrated that the mirror 26a is pivoted about the middle 25' into the other telescope mirror 26b, until the two mirrors 26a, 26b moved into one another have the same position and thus yield the concavely curved telescope mirror 26 according to FIGS. 2 and 7. The plane mirror 25 arranged according to the original middle plane 25' will then be located opposite thereto, cf. FIG. 7.

Figure 7:
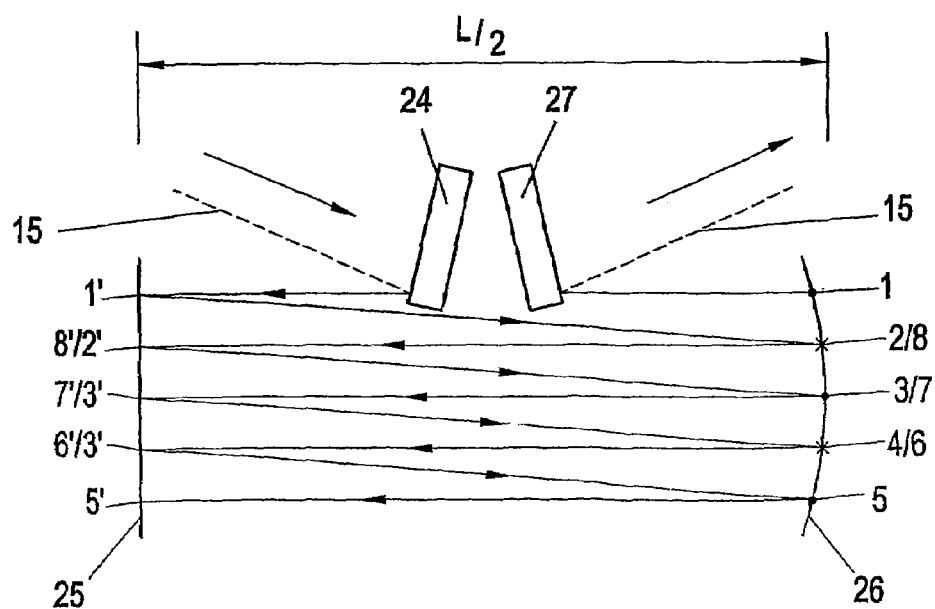
FIG. 7 shows a view of a telescope formed according to the invention, with a concave curved mirror and a plane mirror, also in-coupling of the laser beam into the telescope as well as out-coupling of the laser beam from the telescope being schematically illustrated.

From this "folding" of the conventional telescope there also results the halving of the length dimension in the inventive telescope 18 as well as furthermore that now all the reflection points 1 to 8 according to FIGS. 3 to 5 are present on the one remaining concavely curved mirror 26, cf. also FIG. 8 in addition to FIG. 7, in which these reflection points 1 to 8 are visible in a schematic illustration of the mirror 26. In addition, in FIG. 8 also the central angle α which is decisive for the angular offset has been entered. To facilitate distinguishing, the reflection points originally present on a mirror 26a are illustrated by small circles (reflection points 1, 3, 5 and 7), whereas the reflection points 2, 4, 6, 8 originally present on the other mirror 26b have been illustrated by crosses. In the thus-obtained, final inventive arrangement therefore the reflection points 1 to 8 of the one and of the other telescope mirror 26a, 25b, respectively, follow each other alternately, each offset relative to the other by an angle α/2, and opposite thereto, with an offset thereto by an angle according to α/4, there are the reflection points 1' to 8' on the plane mirror 25, cf. FIG. 7.

Accordingly, the telescope design according to FIG. 7 can also be viewed such that the mirror 26 corresponds to the mirror 26b of FIG. 3, wherein it additionally contains the reflection points of the other concave mirror 26a. As the counter-piece to this "combined" concave telescope mirror 26, the plane mirror 25 will then serve whose distance (L/2) from the telescope mirror 26 thus corresponds to half the distance (L) between the telescope mirrors 26a, 26b of FIG. 3.

FIG. 9 shows the progress of the transversal radius R' of the laser beam 15 in dependence on the path x thereof through the laser device 11, it being visible that there exists a relatively small beam cross-section on the end mirror M4 of the short resonator arm 16 which then increases in this short resonator arm 16 as far as to the laser crystal 14; as has already been discussed, the laser crystal 14 causes focusing of the laser beam, which is visible by the narrow indentation in the curve of FIG. 9. Subsequently, the long resonator arm 17 follows as far as to the supply of the laser beam to telescope 18, the beam cross-section at the entrance of the telescope 18 being relatively large. This fact is also utilized by the present device, since in this manner a good stability can be achieved in the oscillator without any problems, since during the multiple reflections in the telescope 18—cf. also the reflections in FIG. 9 provided with the numbers corresponding to the reflection points 1 to 8 in telescope 18—only slight changes in the beam cross-section prevail in each case, other than would be the case if the telescope were associated to the short resonator arm 16. By this, a stable oscillation can be achieved in the laser device 11 without any problems, also slight changes in length hardly leading to any instability.

The diagram of FIG. 9 is only quite schematic and shall illustrate the relations with the inventive, particularly preferred embodiment of the laser device 11—with weakly focusing arrangement and association of the telescope 18 to the long resonator arm 17. On the other hand, FIGS. 11 to 14 show computer simulations to quite concrete embodiments, wherein also the situation for highly focusing arrangements, or for such with telescopes 18 associated with the short resonator arm 16, respectively, are illustrated. In these diagrams, also the reflection points 1 to 8, the resonator arms 16, 17 as well as the laser crystal 14 are entered for greater ease of understanding.

Yet, at first an explanation regarding the stability of the entire system shall be given by way of FIG. 10. For this, the relation $L/R = 1 \pm \sqrt{(1+\cos\alpha)/2}$ is important, wherein L is twice the distance between the curved mirror 26 and the plane mirror 25, R is the radius of curvature of the curved, concave mirror 26, and α is the central angle between two respective sequential reflection points actually associated to the one curved mirror and located on a circle line.

Departing from the fact that, as previously explained by way of FIGS. 7 and 8, a total of eight reflection points 1 to 8 are present (i.e., four reflection points for each—imaginary—curved mirror 26a, 26b), the central angle amounts to α=90°, as also appears from FIGS. 4, 5 and 8. Furthermore, the sign "−" in the above-indicated relation corresponds to the previously explained weak-focusing arrangement (whereas the sign "+" holds for the highly focusing arrangement). Accordingly, for the example with a total of eight reflection points 1 to 8 and for the weak-focusing arrangement it results from the aforementioned relation:

$$L/R = 1 - \sqrt{1/2}$$

Hence follows that the relation L/R=0.293. For a mirror radius of R=5000 mm (radius values for concavely curved mirrors commonly are indicated with a "−" sign, cf. also FIG. 10, yet here they are given without sign so as to simplify matters), thus there results a distance between the mirrors 26a, 26b of L=1465 mm. This distance L would be too large for a discrete set-up (cf. the mounting plate dimension a=900 mm in the case of the embodiment of FIG. 2), yet with the "folding" of the telescope 18 described by way of FIGS. 6 and 7, this distance leads to a highly adequate arrangement in which the curved mirror 26 and the plane mirror 25 are spaced apart precisely by L/2=732.5 mm.

In the instance of a highly focusing arrangement, as in principle is shown in the initially mentioned document by Cho et al., a bundling of the beam paths is effected between the two concavely curved mirrors, as mentioned, and in this highly focusing arrangement the sign "+" must be used in the above relation, from which the relation L/R will then yield a value of L/R=1.707. With a distance between the mirrors of L=1465 mm, this will mean for a radius R of the respective telescope mirror of R=L/1.707=858 mm. With such a concavely curved mirror 26 and a plane mirror 25 at a distance of L/2=732.5 mm, the reflection points according to the numbers indicated in parentheses in FIG. 5 would be obtained.

In FIG. 10, the x-axis is exactly the (double) mirror-distance L (logarithmically shown). A box has been drawn around the arrangement realized in practice (cf. also FIG. 12). The associated curve 30 is formed in that the telescope 18 is coupled into the long arm 17 of the oscillator (1200 mm). If the radius R is changed, the distance L will change. If the relative (i.e. percent) change ΔD of the beam diameter in the other arm 16 is calculated, i.e. at the end mirror M4, there results a value which has been entered on the y-axis in FIG. 10. The maximum of the stability is precisely at that location where the beam diameter does not change despite a change of the telescope 18, i.e. at zero. In FIG. 10, curves 31, 32 and 33 have also been illustrated for other embodiments and for reasons of comparison:

Curve 30: This is the case discussed with the weak-focusing arrangement and the telescope 18 associated to the long resonator arm 17. The point of intersection of the curve 30 with the zero line is at R=4000 mm. For the practical embodiment in question (FIG. 12) precisely this mirror was not obtainable at short notice; therefore, an arrangement with a mirror 26 with R=5000 mm was realized, cf. also the following explanations regarding FIG. 12.

Curve 31: A telescope 18 in the long resonator arm 17 and a small radius of curvature (such as, e.g., R=858 mm) would generate this curve 31. The relations at R=858 mm (point 34) would yield a much poorer stability as compared to curve 30. Even though there also exists a stable point (point 35) at which the changes are small, the former would be located at very large distances between the two mirrors (L=6 m).

Curve 32: If the weakly focusing telescope 18 (e.g. with a mirror radius R=5000 mm) is associated to the short arm 16 of the original oscillator 12, this curve 32 is formed. Here, again, the maximum of the stability is found at very small values of the distance L (<20 cm). By this—contrary to what is intended—no great overall lengthening of the laser beam path would result.

Curve 33: In a combination of the short resonator arm 16 as telescope arm and a highly focusing arrangement, the maximum of the stability is, in fact, also at a very good location (at L=0.8 m), yet in this case at that location the curve 33 has a great slope.

In practice, however, deviations in the production (of up to 10%) may very well occur in the mirror radii. Also, the model used is not quite precise, and deviations in the measured and calculated beam profile may occur. Therefore, it is even more important to find broad maximums (as in curve 30), and not critical ones (as in curve 33).

Figure 11:
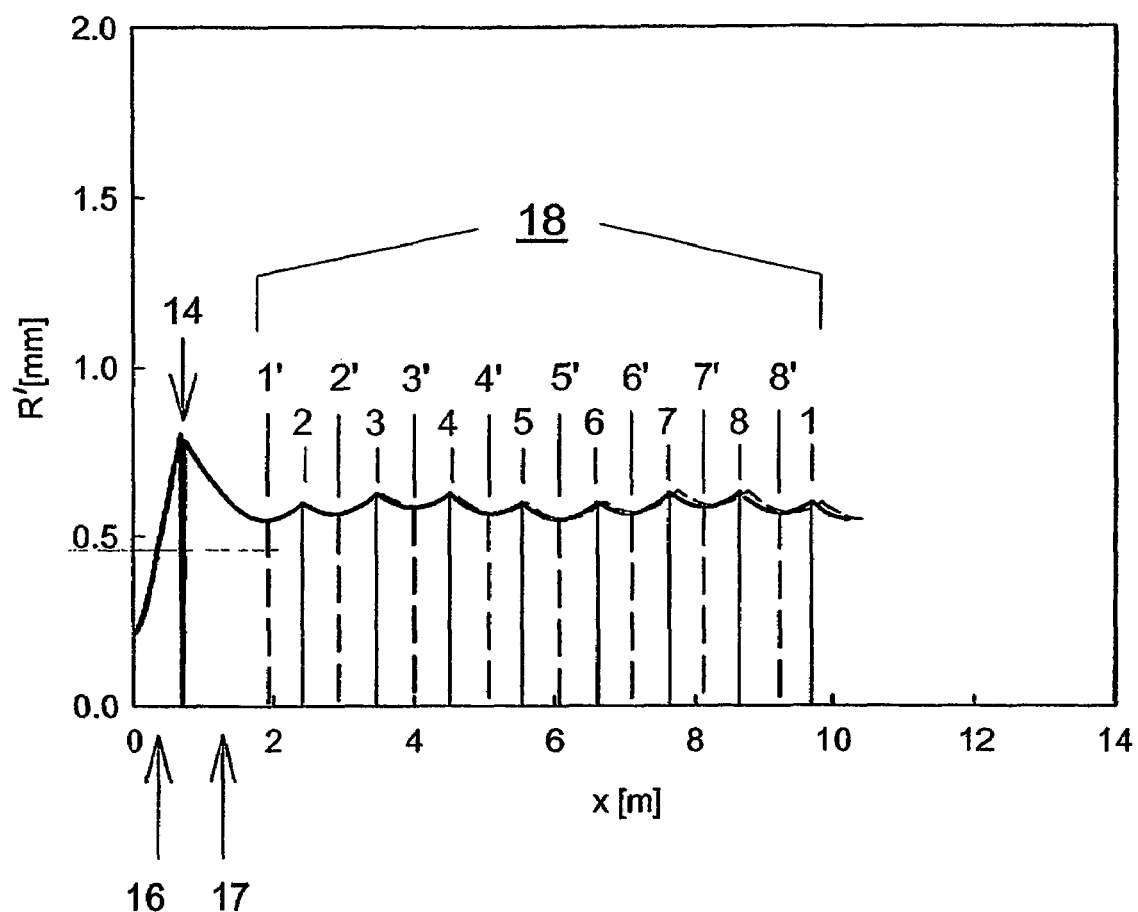
Figure 12:
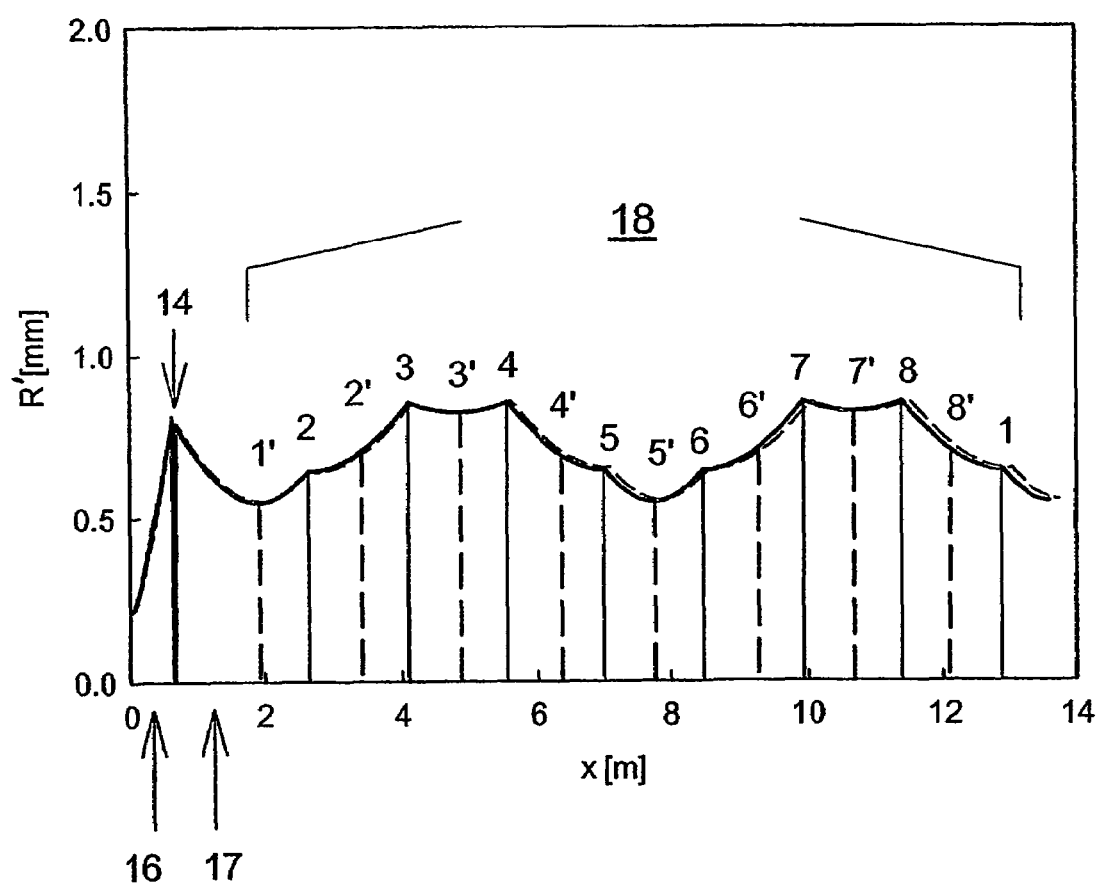

In FIGS. 11 to 15 curves relating to the transverse beam radius R' in mm belonging to actual embodiments are shown versus the resonator length x in m spread on a line (x-axis), these embodiments being based on computer simulations, the embodiment according to FIG. 12, however, having been realized in practice for test purposes.

In all the diagrams of FIGS. 11 to 15, the continuous line shows the relation at the ideal oscillator, in which all the length values correspond to the theoretical values. The broken line simulates a (as such very pronounced) deviation of 2 cm between the two telescope mirrors 25, 26. Is appears that in practice no large deviations occur, yet tests have shown that vibrations and temperature drifts occur. If, however, the laser (in the region of the short resonator arm 16) exhibits no drastic shifts even in case of large deviations it can be assumed that also slight vibrations which will lead to slight changes in the distance, e.g. between the telescope mirrors 25, 26, will not play any role as regards the stability.

In FIG. 11, the beam radius R' in transverse direction is indicated over the resonator length x in m for a laser device 11, wherein the resonator data are as follows:
short resonator arm 16: 65 cm;
long resonator arm 17: 120 cm (with the telescope 18 following thereon);
distance between the telescope mirrors 25, 26: L/2=52 cm;
radius of the concave telescope mirror 26: R=3550 mm;
total length of oscillator 12: 10.22 m.

This diagram corresponds to an embodiment with an optimum in the stability of the resonator 12. However, here the distances between the telescope mirrors 25, 26 are not very large so that the round trip time of the laser pulses is not extended as much as desired and the repetition rate would merely be reduced to 14.6 MHz.

As has already been mentioned before, a concave mirror having a radius R=5000 mm was available for practical investigations. With this mirror as telescope mirror 26, a laser device was built up as described, and it was put up with the fact that the optimum stability (cf. the zero line in FIG. 10) is no longer given, but a slight deviation thereof, cf. the dot in the box on the curve 30 in FIG. 10. The deviations resulting in this case are, however, tolerable, since the curve 30 in this region, as can be seen from FIG. 10, is very flat, with a rise of practically=0. In FIG. 12, the associated diagram beam radius/resonator length is illustrated.

Here, the resonator data were as follows:
short resonator arm 16: 65 cm;
long resonator arm 17: 120 cm (telescope 18 following thereon);
distance between the telescope mirrors 25, 26: L/2 73.2 cm;
radius of the telescope mirror 26: R=5000 mm;
total length of the resonator 12: 13.6 m.

Figure 13:
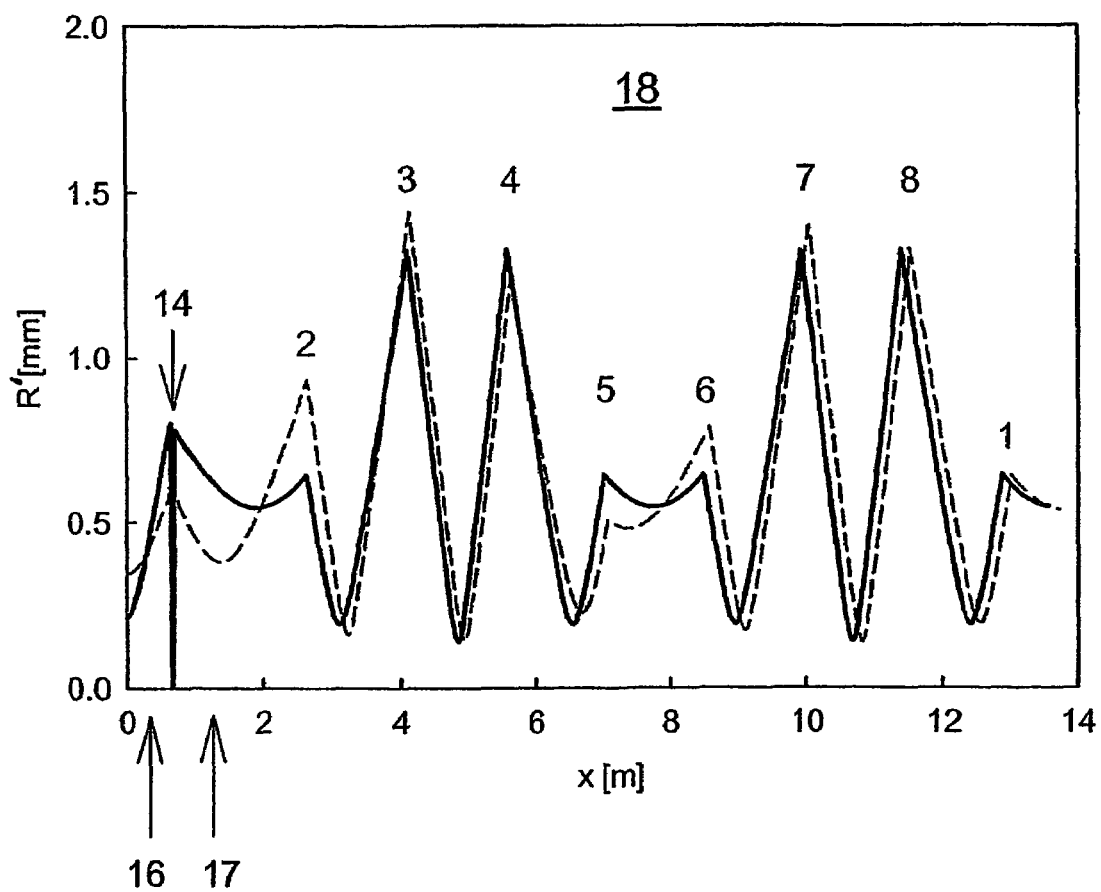

In FIG. 13, a case is illustrated in which a highly focusing arrangement in telescope 18 following the long resonator arm 17 is provided; this results in a not very stable configuration with regard to the variation of the mirrors 25, 26 of the telescope 18. This can be directly recognized from the diagram of FIG. 13 on the basis of the deviations of the broken line from the full line.

Resonator data:
short resonator arm 16: 65 cm;
long resonator arm 17: 120 cm (telescope 18 following thereon);
distance between the telescope mirrors 25, 26: L/2=73.2 cm;
radius of the telescope mirror 26: R=849 mm;
total length of resonator 12: 13.6 m.

Thus, the diagram according to FIG. 13 would approximately correspond to spot 34 on curve 31 in FIG. 10.

Figure 14:
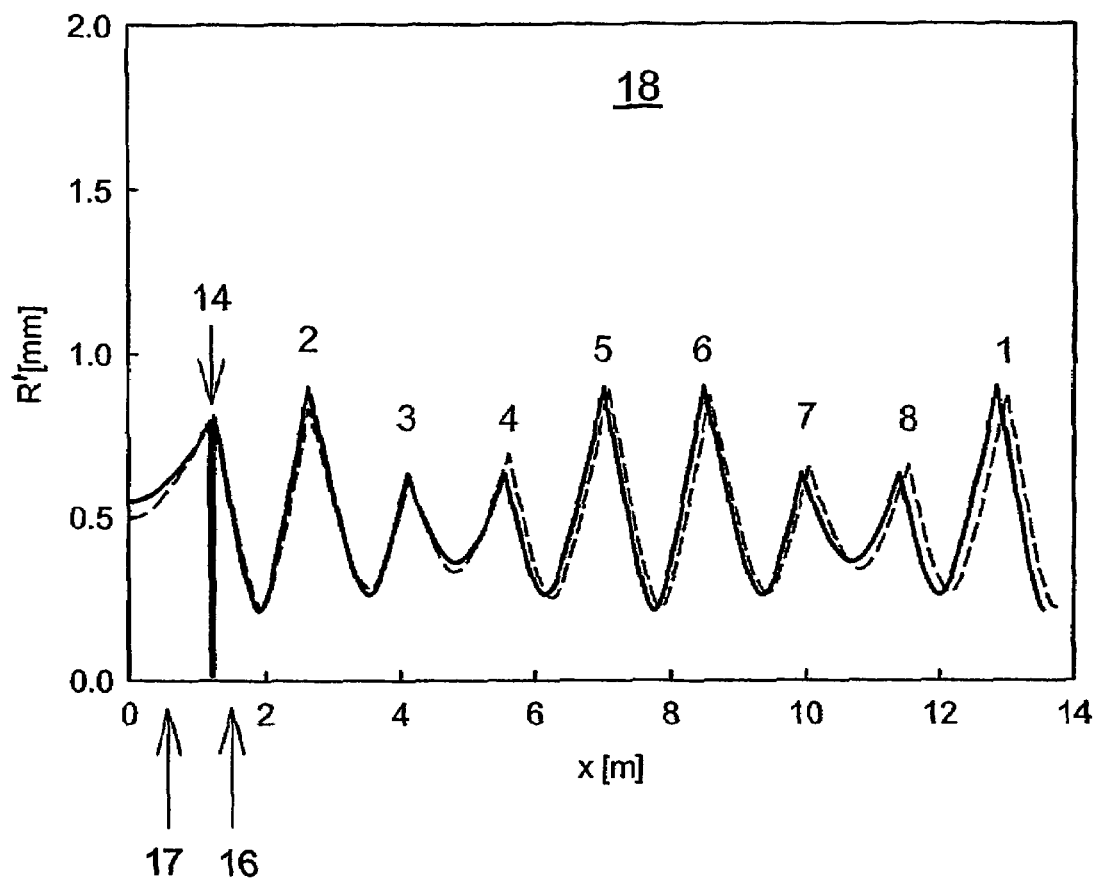

In FIG. 14 the case is illustrated in which the telescope 18 is arranged to follow the short resonator arm 16, it being visible in comparison to FIG. 13 in case of a highly focusing arrangement in the telescope (as previously mentioned) that in terms of stability even somewhat better conditions can be attained. This highly focusing arrangement is better adapted to the short resonator arm 16. This is also shown by the beam diameters which do not vary so much in FIG. 14 as compared to FIG. 13.

The resonator data regarding FIG. 14 are as follows:
short resonator arm 16: 65 cm (telescope 18 following thereon);
long resonator arm 17: 120 cm;
distance between the telescope mirrors 25, 26: L/2=73.2 cm;
radius of the telescope mirror 26: R=849 mm;
total length of resonator 12: 13.6 m.

Figure 15:
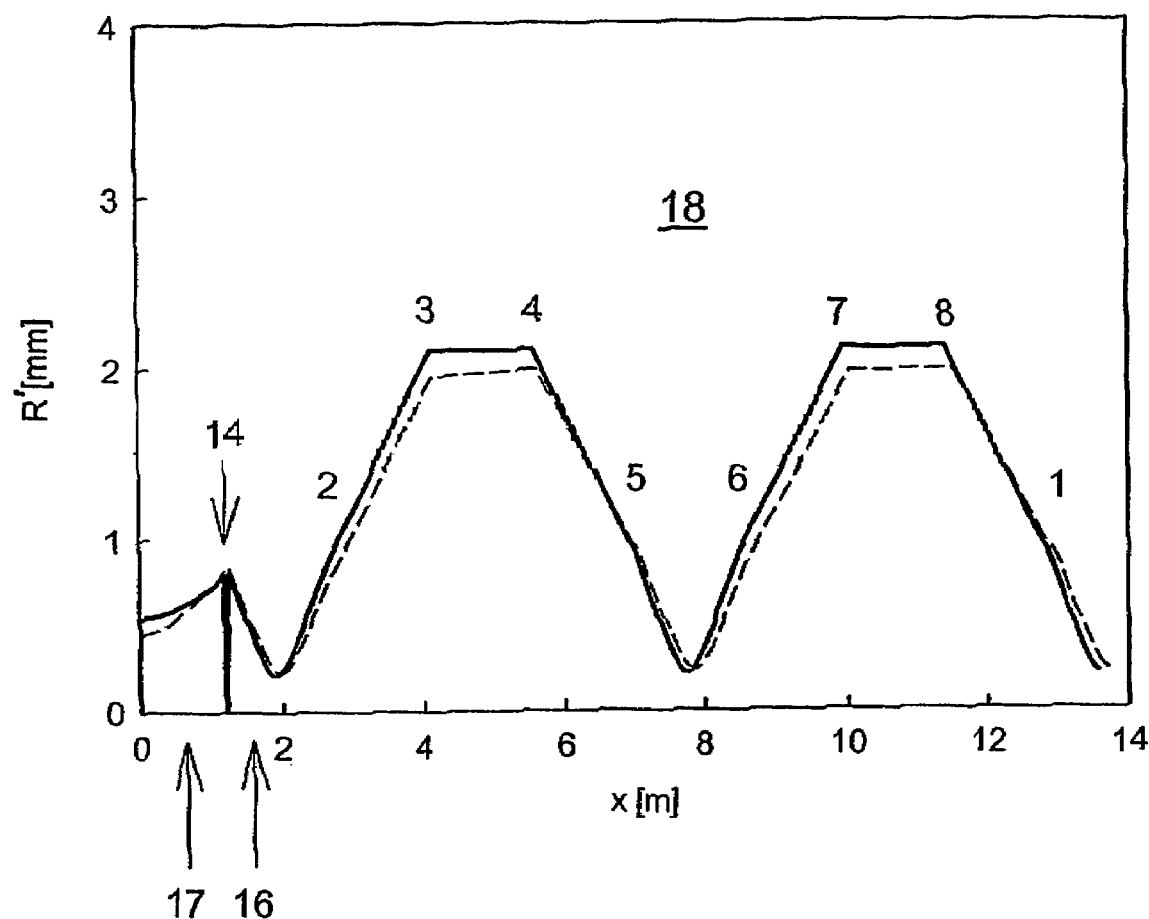

Finally, from the diagram of FIG. 15 it appears how advantageous the coupling of the telescope 18 into the long resonator arm 17 is, because if the telescope 18 is located to follow the short resonator arm 16, a highly divergent laser beam 15 is in-coupled into the telescope 18. In contrast to the representation given in FIG. 11, the first reflection point of the weakly focusing telescope 18 therefore does not have the effect of bundling the laser beam again. It is only the second reflection point which achieves this collimation after a long path. Therefore, the maximum beam radius R' on individual reflection points of the telescope mirror is >2 mm, i.e. the beam diameter is larger than 4 mm. In practice, however, a space larger by the factor 3 must be present at the telescope mirror for the respective beam in order not to lose any power output. Here, however, this means that an area having a diameter of more than 1 cm must be present on the mirror per reflection point, whereby all the faults in the uniformity of the mirror will be found in the laser beam images in magnified form, resulting in beam deformations.

The resonator data pertaining to FIG. 15 are as follows:
short resonator arm 16: 65 cm (telescope following thereon);
long resonator arm 17: 120 cm;
distance between the telescope mirrors 25, 26: L/2=73.2 cm;
radius of the concave telescope mirror 26: R 5000 mm;
total length of resonator 12: 13.6 m.

The invention claimed is:

1. A short pulse laser device with mode-locking, comprising:
   a resonator containing a laser crystal as well as several mirrors which define a long resonator arm as well as a short resonator arm, one of said several mirrors being a pump beam in-coupling mirror, and another of said several mirrors being a laser beam out-coupler, and a multiple reflection telescope increasing the resonator length and associated with one of the long resonator arm and the short resonator arm, said multiple reflection telescope being constructed using mirrors in order to reflect a laser beam coupled into the space between them back and forth between the mirrors several times before the laser beam is out-coupled back into the remaining resonator, sequential eccentric reflection points on the mirrors being offset relative to one another, wherein the telescope has only one curved mirror and a plane mirror, the position of the plane mirror being substantially midway between a first imaginary curved mirror and a second imaginary curved mirror forming an imaginary multiple reflection arrangement, the one curved mirror of the telescope being located in the position of the first imaginary curved mirror and containing the reflection points of the second imaginary curved mirror.

2. A short pulse laser device according to claim 1, wherein the curved mirror is a concave mirror.

3. A short-pulse laser device according to claim 1, wherein on the one curved mirror, reflection points of the one curved mirror and reflection points of the second imaginary curved mirror are alternately arranged on an imaginary circle, each pair of adjacent reflection points being separated by equal arcuate distances on the imaginary circle.

4. A short-pulse laser device according to claim 1, wherein a total of eight reflection points are provided on the one curved mirror.

5. A short-pulse laser device according to claim 1, wherein the distance between the one curved mirror and the plane mirror and the radius of curvature of the one curved mirror correspond to a relation $L/R = 1 \pm \sqrt{(1+\cos\alpha)/2}$, wherein L is twice the distance between the one curved mirror and the plane mirror, R is the radius of curvature of the one curved mirror, and $\alpha$ is the central angle between two respective sequential reflection points actually associated to the one curved mirror and located on an imaginary circle.

6. A short-pulse laser device according to claim 5, wherein the one curved mirror is a concave mirror, for which the relation is:

$$L/R = 1 - \sqrt{(1+\cos\alpha)/2}.$$

7. A short-pulse laser device according to claim 1, wherein substantially midway between the one curved mirror and the plane mirror, in- and out-coupling mirrors for the laser beam are provided in one of the beam paths between respective reflection points on the one curved mirror and the plane mirror.

8. A short-pulse laser device according to claim 1, wherein the telescope is associated with the long resonator arm.

9. A short-pulse laser device according to claim 1, wherein said mode-locking is passive mode-locking.

10. A multiple reflection telescope for a short-pulse laser device, said multiple reflection telescope increasing a resonator length of said short-pulse laser device, said telescope reflecting a laser beam back and forth between the mirrors several times before the laser beam is out-coupled into the short-pulse laser device, sequential eccentric reflection points on the mirrors being offset relative to each other, wherein said mirrors include only one curved mirror and a plane mirror, the position of the plane mirror being substantially midway between a first imaginary curved mirror and a second imaginary curved mirror forming an imaginary multiple reflection arrangement, the one curved mirror of the telescope being located in the position of the first imaginary curved mirror and also containing the reflection points of the second imaginary curved mirror.

11. A multiple-reflection telescope according to claim 10, that wherein the curved mirror is a concave mirror.

12. A telescope according to claim 10, wherein on the one curved mirror reflection points of the one curved mirror and reflection points of the second imaginary curved mirror are alternately arranged on an imaginary circle, each pair of adjacent reflection points being separated by equal arcuate distances on the imaginary circle.

13. A telescope according to claim 10, wherein a total of eight reflection points are provided on the one curved mirror.

14. A telescope according claim 10, wherein the distance between the one curved mirror and the plane mirror and the radius of curvature of the one curved mirror correspond to a relation $$L/R = 1 \pm \sqrt{(1+\cos\alpha)/2},$$

wherein

L is twice the distance between the one curved mirror and the plane mirror,

R is the radius of curvature of the one curved mirror, and $\alpha$ is the central angle between two respective sequential reflection points actually associated to the one curved mirror and located on an imaginary circle.

15. A telescope according to claim 14, wherein the one curved mirror is a concave mirror for which the relation is:

$$L/R = 1 - \sqrt{(1+\cos\alpha)/2}.$$

16. A telescope according to claim 13, wherein substantially midway between the one curved mirror and the plane mirror, in- and out-coupling mirrors for the laser beam are provided in one of the beam paths between respective reflection points on the one curved mirror and the plane mirror.

* * * * *